United States Patent [19]

Wank et al.

[11] 3,889,040

[45] June 10, 1975

[54] PROCESS FOR THE CONTINUOUS COATING OF PLASTICS

[75] Inventors: Joachim Wank, Zons; Eckart Reese, Dormagen; Josef Rohrbach, Schildgen; Rolf Bruck, Odenthal, all of Germany

[73] Assignee: Bayer Aktiengesellschaft, Germany

[22] Filed: May 21, 1973

[21] Appl. No.: 362,483

[30] Foreign Application Priority Data
May 26, 1972 Germany............................ 2225644

[52] U.S. Cl. ................. 428/412; 428/425; 428/447
[51] Int. Cl. ............................................. B32b 27/08
[58] Field of Search ....... 117/166, 161 KP, 161 ZA, 117/161 K, 145, 138.8 F, 138.8 UA, 138.8 A; 161/190, 165, 183

[56] References Cited
UNITED STATES PATENTS

| | | | |
|---|---|---|---|
| 2,617,748 | 11/1952 | Bjorksten et al................ | 117/166 X |
| 2,628,923 | 2/1953 | Yaeger............................ | 117/166 X |
| 2,702,255 | 2/1955 | Yaeger............................ | 117/166 X |
| 2,974,057 | 3/1961 | Adams............................ | 117/166 X |
| 3,392,183 | 7/1968 | Windsmuth et al............ | 117/161 KP |
| 3,655,432 | 4/1972 | Hausslein et al. ............. | 117/138.8 F |
| 3,737,479 | 6/1973 | Haaf.......................... | 117/161 ZA X |
| 3,781,251 | 12/1973 | Hermes ..................... | 117/161 ZA X |

Primary Examiner—Ralph Husack
Attorney, Agent, or Firm—Connolly and Hutz

[57] ABSTRACT

Process for the manufacture of a laminate comprising a substrate of an impact-resistant plastic material by coating with a second plastic material having a coefficient of static friction no more than 0.5, a modulus of elasticity between 200 and 2000 kgs/cm$^2$, a maximum tolerated surface limiting work in the linear region of the stress-strain diagram, determined from a high-speed tear test at 10 m/sec on a test rod according to Buchmann, of less than 2500 mkp/s 1/cm$^2$, and a speed of recovery after stressed of between 1 and 10 m/sec, comprising continuously coating the first plastic material with solutions of the second plastic material containing a cellulose ester or a silicone oil.

1 Claim, No Drawings

PROCESS FOR THE CONTINUOUS COATING OF PLASTICS

According German Offenlegungsschrift No. 2 058 504 (pending U.S. application Ser. No. 202,467, filed Nov. 26, 1971 and now abandoned) plastics laminates are known of which the surfaces do not suffer any optically detectable damage under impact stress or abrasive stress due to foreign bodies, and a process for their manufacture, which is characterised in that a substrate of an impact-resistant first plastics material is coated on one or both sides with a second plastics material having a coefficient of static friction no more than 0.5, a modulus of elasticity between about 200 and 2000 kp/cm$^2$, a maximum tolerated surface-limiting work in the linear region of the stress-strain diagram, determined from a high speed tear test at 10 m/second using a Buchmann test rod, of less than about 2500 m kp/s . l/cm$^2$, and a speed of recovery after being stressed of between about 1 and about 10 m/second.

The impact-resistant plastics can be coated either discontinuously or continuously.

As a further development of this process it has been found that optically perfect plastics laminates or multi-layer materials can be manufactured continuously particularly advantageously if the coating of the impact-resistant plastic with the second plastics mentioned above and defined in the German Offenlegungsschrift 2 058 504 (pending U.S. application Ser. No. 202 467), being suitable for coating impact-resistant plastics, is carried out with these second plastics dissolved in solvents, and in the presence of solutions of certain additives.

Accordingly, the subject of the present invention is a process for the manufacture of a laminate comprising a substrate of an impact-resistant first plastics material coated on one or both sides with a second plastics material having a coefficient of static friction no more than 0.5, a modulus of elasticity between 200 and 2000 kp/cm$^2$, a maximum tolerated surface-limiting work in the linear region of the stress-strain diagram, determined from a high-speed tear test at 10 m/sec. on a test rod according to Buchmann, of less than 2500 m kp/s · l/cm$^2$, and a speed of recovery after being stressed of between 1 and 10 m/sec, the process of which is characterised in that the coating of impact-resistant first plastics material is carried out continuously with solutions of the second plastics material with which at least one solution of at least one cellulose ester or of at least one silicone oil has been mixed.

The continous process can be carried out by means of a casting machine in a known manner.

Examples of suitable cellulose esters are those with viscosities of between 0.4 and 2 poise (measured in a 20 per cent strength solution in acetone); Examples of suitable silicone oils are those with viscosities of between 1.5 and 2.5 poise and surface tensions of between 20 and 26 dyn/cm$^{-1}$.

The cellulose esters are used as 5 to 40 percent strength solutions, for example in ethyl acetate, methylene chloride, acetone or mixtures of these solvents.

The silicone oils are employed as 0.1 to 10 per cent strength solutions in the abovementioned solvents.

When using cellulose esters, for example cellulose acetobutyrate (Cellit BP 300) as additives, amounts of 0.5 to 5 percent by weight, relative to the amount of plastic to be used in each case for the coating of impact-resistant plastics, are particularly advantageous.

When using silicone oils, for example silicone oil PL, as additives, amounts of 0.01 to 2 percent by weight, relative to the particular amount of plastic to be used for the coating of impact-resistant plastics, are particularly advantageous.

The amount of plastic to be used for the coating of impact-resistant plastics depends, for a given surface area, on the thickness of the coating. The thickness of the coating is in general between 50$\mu$ and 200$\mu$.

Additionally to the solutions of cellulose esters or silicone oils, it is possible optionally to use conjointly orthoformic acid triethyl ester and/or 2-cyclohexyl-6-tert.-butyl-p-cresol in amounts of 1 to 4 percent by weight, relative to the particular amount of plastics to be used for the coating, and these substances can be mixed into the solutions of the abovementioned additives and/or the solutions of the plastics suitable for coating.

The plastics to be used for the coating of impact-resistant plastics are, for example, polyurethanes from aliphatic and cyclaliphatic diisocyanates or polyisocyanates, biurets, urethanes and isocyanates, such as: 1,4-butane-diisocyanate, 1,2-isocyanato-methyl-cyclobutane, 1,6-hexamethylenediisocyanate or its biuret, 1,4-cyclohexyldiisocyanate, 4,4'-dicyclohexylmethanediisocyanate, 1,10-decanediisocyanate, 1-isocyanato-3-isocyanato-methyl-3,5,5-trimethyl-cyclohexane, 1,6-diisocyanato-2,2,4-trimethylhexane or, for example, the urethane from trimethylolpropane and 1,6-hexamethylenediisocyanate or the isocyanurate of 1,6-hexamethylene-diisocyanate, and polyols, for example manufactured from propylene glycol, butylene glycol, trimethylolpropane and sorbitol and ethylene oxide or propylene oxide, having an average molecular weight of between about 250 and about 2000. Furthermore, it is possible to employ any suitable polyol, including a polyester manufactured from a lactone, or from polycarboxylic acids and polyhydric alcohols, for example sebacic acid, oxalic acid, phthalic acid and terephthalic acid, and 1,4-butanediol, propylene glycol, diethylene glycol, trimethylolpropane and glycerol.

Other plastics of this nature are, for example, unsaturated polyesters in the usual sense, namely unsaturated polymerisable polyesters, especially those containing radicals of $\alpha,\beta$-unsaturated dicarboxylic acids of the type of maleic acid or fumaric acid, and as a rule containing radicals of other dicarboxylic acids, such as phthalic acid and adipic acid, and containing radicals of organic dihydroxy compounds, for example ethylene glycol, butylene glycol, 1,6-hexanediol and diethylene glycol, and optionally radicals of small amounts of monoalcohols and trialcohols. These compounds mentioned are polymerised with monomeric, unsaturated copolymerisable compounds, such as styrene, substituted styrenes, acrylic and methacrylic acid derivatives, allyl alcohols and their esters, using catalysis by organic peroxides.

These plastics, to be used for the coating, are in each case preferably applied as 30 to 80 per cent strength by weight solutions of ethyl acetate or perchloroethylene, or mixtures thereof, onto the impact-resistant plastic to be coated.

Where the polyurethanes are used for the coating of impact-resistant plastics, catalysts such as, for example dibutyl-tin dilaurate, must be added for the accelerated production of the polyurethanes.

For the continous coating, according to the invention, of impact-resistant first plastics material, the second plastics material to be used for the coating and described above for the scratch-resistant coating of impact-resistant plastics are mixed, in solution, with the abovementioned solutions of the additives, whilst avoiding the inclusion of air.

After the mixtures obtained have been cooled to at least 0°C, they are fed by means of a pump to a casting device, which is in itself known, of a casting machine, by means of which the impact-resistant plastic to be coated is coated in a known manner. The drying of the coated plastics is carried out in accordance with customary processes, for which the drying air to be used must be dust-free.

Suitable impact-resistant plastics which can advantageously be coated according to the process of the invention are for example, polyesters, such as polycarbonates, or polyethylene glycol terephthalates, polyethers, such as polysulphones and polyphenylene oxide, polyamides, plasticised or unplasticised cellulose esters, and also polystyrene and styrene copolymers, polymethyl methacrylate and methyl methacrylate copolymers, acrylonitrile-butadiene-styrene terpolymers, polymethylpentene-1, polyvinyl chloride and also curable plastics, such as poly-diethylene glycol-bis-allyl-carbonate, unsaturated polyester resins, epoxide resins, phenolic resins, melamine resins and urea resins.

As impact-resistant plastics to be coated according to the process of the invention there should preferentially be mentioned, amongst those named above cellulose acetobutyrate (Triafol) and polycarbonate (Makrofol).

Where plastics based on the polyurethanes, mentioned above, are employed for the coating according to the invention, these plastics are as a rule only produced during the coating process from polyisocyanates and polyols in a manner which is in itself known, the addition of catalysts such as, for example, dibutyl-tin-dilaurate, being of advantage.

The plastics laminates manufactured according to the process of the invention have excellent optical properties.

A measure of the optical properties are volume turbidity, wedge angle and dioptric interference, according to DIN 52,305.

As a result of these excellent optical properties the plastics laminates obtainable according to the process of the invention can be used particularly successfully in combination with glass plates, using, for example, polyvinylbutyral as the adhesive intermediate layer, say analogously to German Offenlegungsschrift (German Published Specification) No. 1,569,207.

EXAMPLE 6,300 ml of a 75 percent strength solution of a biuret of hexamethylenediisocyanate in ethyl acetate, 3,900 ml of a polyether of trimethylolpropane and propylene oxide, 500 ml of a 30 percent strength solution of a cellulose acetobutyrate (Cellit BP 300) in ethyl acetate, 320 ml of orthoformic acid triethyl ester, 220 ml of an 0.9 percent strength solution of dibuty-tin dilaurate in ethyl acetate, 90 g of 2-cyclohexyl-6-tert.-butyl-p-cresol and 2,000 ml of ethyl acetate are intimately mixed in a temperature-controlled stirring vessel, whilst avoiding the inclusion of air, and cooled to 0°C.

This mixture is fed by means of a pump to a casting device, which is in itself known, of a casting machine, in which this mixture is spread on a cellulose acetobutyrate film (Triofol B) (thickness 200 $\mu$m) at a uniform thickness of ~350 $\mu$m, at a speed of approx. 3 $m$ per minute.

After casting, the coated film is dried at approx. 120°C.

The resulting plastics laminate has the following properties:

| | | |
|---|---|---|
| Volume turbidity | 0.1% | |
| Wedge angle (displacement of the projected lines) (mm) | 2 | (DIN 52,305 AS) |
| Dioptric interference (width of the projected strips) | | |
| Max. (mm) | 14 | |
| | | (DIN 52,305 AZ) |
| Min. (mm) | 8 | |

If the coating is carried out without the additives according to the invention, a plastics laminate having the following properties is obtained:

| | | |
|---|---|---|
| Volume turbidity | >2% | |
| Wedge angle (displacement of the projected lines) (mm) | >20 | (DIN 52,305 AS) |
| Dioptric interference (width of the projected strips) | | |
| Max. (mm) | 80 | |
| | | (DIN 52,305 AZ) |
| Min. (mm) | 0 | |

We claim:

1. In the process for manufacturing a laminate by coating a substrate of an impact-resistant first plastic material with a second plastic material which is a polyurethane or an unsaturated polyester having a coefficient of static friction of up to 0.5, a modulus of elasticity of between 200 and 2,000 kg/cm$^2$, a maximum tolerated surface limiting work in the linear region of the stress-strain diagram, determined from a high-speed tear test at 10 m/sec on a test rod according to Buchmann, of less than 2,500 mkp/s . 1/cm$^2$ and a speed of recovery after stressing of between 1 and 10 m/sec, the improvement which comprises coating the first plastic material with a 30 to 80 percent by weight solution of said second plastic material containing admixed therewith a 5 to 40 percent by weight solution of a cellulose ester or a 0.1 to 10 percent by weight solution of a silicone oil, the amount of cellulose ester solution employed supplying 0.5 to 5 percent by weight of cellulose ester and the amount of silicone oil solution employed supplying 0.01 to 2 percent by weight of silicone oil, said amounts being based on the amount of second plastic material coated on said substrate.

* * * * *